United States Patent
Wilkens

(10) Patent No.: US 8,002,220 B2
(45) Date of Patent: Aug. 23, 2011

(54) RATE LIMITED ACTIVE PILOT INCEPTOR SYSTEM AND METHOD

(75) Inventor: Dean R. Wilkens, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 912 days.

(21) Appl. No.: 11/924,413

(22) Filed: Oct. 25, 2007

(65) Prior Publication Data

US 2009/0302171 A1 Dec. 10, 2009

(51) Int. Cl.
*B64C 13/04* (2006.01)
*B64C 13/46* (2006.01)

(52) U.S. Cl. ....................................... 244/223
(58) Field of Classification Search .......... 244/220, 244/223, 236, 228
See application file for complete search history.

(56) References Cited

U.S. PATENT DOCUMENTS

| | | | |
|---|---|---|---|
| 4,150,803 A * | 4/1979 | Fernandez | 244/135 A |
| 4,228,386 A * | 10/1980 | Griffith | 318/628 |
| 4,696,445 A * | 9/1987 | Wright et al. | 244/229 |
| 5,224,664 A | 7/1993 | Adams, Sr. et al. | |
| 5,428,543 A * | 6/1995 | Gold et al. | 701/5 |
| 5,694,014 A * | 12/1997 | Hegg et al. | 318/564 |
| 6,128,554 A * | 10/2000 | Damotte | 701/4 |
| 6,459,228 B1 * | 10/2002 | Szulyk et al. | 318/632 |
| 7,108,232 B2 * | 9/2006 | Hoh | 244/223 |
| 2003/0226937 A1 | 12/2003 | Einthoven et al. | |
| 2004/0078121 A1 | 4/2004 | Cartmell et al. | |
| 2005/0173595 A1 | 8/2005 | Hoh | |
| 2005/0230566 A1 | 10/2005 | A'Harrah | |
| 2006/0284021 A1 | 12/2006 | A'Harrah | |

FOREIGN PATENT DOCUMENTS

| | | |
|---|---|---|
| WO | 03040844 A2 | 5/2003 |
| WO | 2007001338 A2 | 1/2007 |

OTHER PUBLICATIONS

EP Search Report dated Jan. 12, 2010, EP 08167063.0-2206 / 2052966.
EP Communication dated Oct. 26, 2010, EP 08167063.0-2206.
Jeram, G. J., Open Design For Helicopter Active Control Systems, School of Aerospace Engineering, Georgia Institute of Technology, Atlanta, GA, 2002.

* cited by examiner

*Primary Examiner* — Joshua J Michener
*Assistant Examiner* — Joseph W Sanderson
(74) *Attorney, Agent, or Firm* — Ingrassia Fisher & Lorenz, P.C.

(57) ABSTRACT

A variable rate limit is implemented in an active inceptor haptic feedback control system. The rate limit is modulated based on a rate error between an aircraft rate command supplied from the active inceptor, and actual aircraft rate. As the rate error increases, the rate limit is reduced, which limits inceptor movement and provides haptic feedback to a user when the rate error is exceeded.

16 Claims, 4 Drawing Sheets

RATE LIMITED ACTIVE PILOT INCEPTOR SYSTEM AND METHOD

TECHNICAL FIELD

The present invention generally relates to fly-by-wire aircraft control systems and, more particularly, to rate limited active pilot inceptor systems and methods for fly-by-wire aircraft control systems.

BACKGROUND

Aircraft typically include a plurality of flight control surfaces that, when controllably positioned, guide the movement of the aircraft from one destination to another. The number and type of flight control surfaces included in an aircraft may vary depending, for example, on whether the aircraft is a fixed-wing or rotary-wing aircraft. For example, most fixed-wing aircraft typically include primary flight control surfaces, such as a pair of elevators, a rudder, and a pair of ailerons, to control aircraft movement in the pitch, yaw, and roll axes. Aircraft movement of rotary-wing aircraft in the pitch, yaw, and roll axes is typically controlled by via movement of the rotating aircraft rotors, and may additionally be controlled via movement of one or more flight control surfaces.

The positions of the aircraft flight control surfaces and/or rotors are typically controlled via a flight control system. The flight control system, in response to position commands that originate from either the flight crew or an aircraft autopilot, moves the aircraft flight control surfaces and/or rotors to the commanded positions. In most instances, this movement is effected via actuators that are coupled to the flight control surfaces. Typically, the position commands that originate from the flight crew are supplied via one or more inceptors. For example, many fixed-wing aircraft include a plurality of inceptors, such as yokes or side sticks and rudder pedals, one set each for the pilot and for the co-pilot, and many rotary-wing aircraft include one or more of a cyclic, a collective, and rudder pedals.

In fly-by-wire flight control systems, the inceptors are inherently disconnected from the aircraft flight control surfaces because, unlike traditional flight control systems, there is no mechanical link between the inceptor and the flight control surfaces. As a result, it is postulated that pilots could introduce control inputs to the inceptor that exceed the response capabilities of the one or more portions of the flight control system. If such a postulated event were to occur, a pilot may exaggerate the control input, which can in turn result in what is known as pilot induced oscillations (PIO). This form of PIO is generally known as Category II PIO or non-linear PIO.

Hence, there is a need for a flight control system and/or inceptor that prevents, or at least reduces the likelihood of, pilot induced oscillations. The present invention addresses at least this need.

BRIEF SUMMARY

In one embodiment, and by way of example only, an active pilot inceptor system includes a pilot inceptor, a motor, and a motor control. The pilot inceptor is configured to receive user input and is operable, in response to the user input, to move to an inceptor position at an inceptor movement rate, and supply signals representative of a commanded aircraft rate. The motor is coupled to the pilot inceptor and is operable, upon being energized, to supply a feedback force to the inceptor that limits at least the inceptor movement rate. The motor control is adapted to receive a rate limit signal that is based on a determined rate error, which is representative of a difference between the commanded aircraft rate and an actual aircraft rate. The motor control is responsive to the rate limit signal to energize the motor to supply the feedback force at a magnitude that limits the inceptor movement rate based on the determined rate error.

In another exemplary embodiment, a flight control system includes a flight control, an inceptor, a motor, and a motor control. The flight control is operable to receive a signal representative of commanded aircraft rate and a signal representative of actual aircraft rate and, in response these received signals, to determine a rate error and supply a rate limit signal based on the determined rate error. The inceptor is configured to receive user input and is operable, in response to the user input, to move to an inceptor position at an inceptor movement rate, and supply the signal representative of commanded aircraft rate. The motor is coupled to the inceptor and is operable, upon being energized, to supply a feedback force to the inceptor that limits at least the inceptor movement rate. The motor control is coupled to receive the rate limit signal and is operable, in response thereto, to energize the motor to supply the feedback force at a magnitude that limits the inceptor movement rate based on the determined rate error.

In yet another exemplary embodiment, a method of limiting pilot induced oscillations in an aircraft includes determining a position of an inceptor, determining a command aircraft rate based on the determined inceptor position, and determining an actual aircraft rate. A rate error is determined from at least the commanded aircraft rate and the actual aircraft rate, and the inceptor position is rate limited based on the determined rate error.

Other desirable features and characteristics of the inceptor system, the flight control system, and method will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, although much of the invention is depicted and described as being implemented for aircraft primary flight control surfaces, it will be appreciated that it may also be implemented, for example, for one or more aircraft secondary flight control surfaces, for aircraft brakes, for aircraft flight simulators, for refueling booms, and/or nose wheel steering. Moreover, although fixed-wing aircraft are depicted and described herein, the invention may also be used in rotary-wing aircraft.

Figure 1:
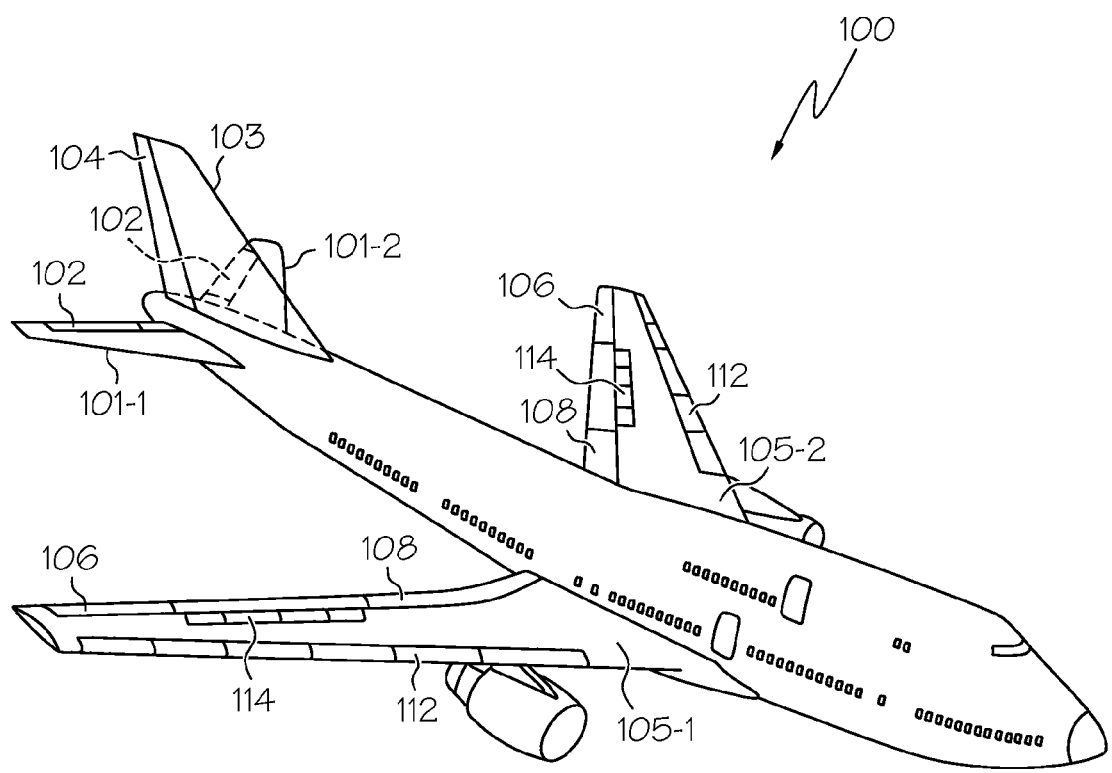
FIG. 1 is a perspective view of an exemplary fixed-wing aircraft depicting primary and secondary flight control surfaces.

Turning now to FIG. 1, a perspective view of an exemplary aircraft is shown. In the illustrated embodiment, the aircraft 100 includes first and second horizontal stabilizers 101-1 and 101-2, respectively, a vertical stabilizer 103, and first and second wings 105-1 and 105-2, respectively. An elevator 102 is disposed on each horizontal stabilizer 101-1, 101-2, a rudder 104 is disposed on the vertical stabilizer 103, and an aileron 106 is disposed on each wing 105-1, 105-2. In addition, a plurality of flaps 108, slats 112, and spoilers 114 are disposed on each wing 105-1, 105-2. The elevators 102, the rudder 104, and the ailerons 106 are typically referred to as the primary flight control surfaces, and the flaps 108, the slats 112, and the spoilers 114 are typically referred to as the secondary flight control surfaces.

The primary flight control surfaces 102-106 control aircraft movements about the aircraft pitch, yaw, and roll axes. Specifically, the elevators 102 are used to control aircraft movement about the pitch axis, the rudder 104 is used to control aircraft movement about the yaw axis, and the ailerons 106 control aircraft movement about the roll axis. It is noted, however, that aircraft movement about the yaw axis can also be achieved by varying the thrust levels from the engines on opposing sides of the aircraft 100.

The secondary control surfaces 108-114 influence the lift and drag of the aircraft 100. For example, during aircraft take-off and landing operations, when increased lift is desirable, the flaps 108 and slats 112 may be moved from retracted positions to extended positions. In the extended position, the flaps 108 increase both lift and drag, and enable the aircraft 100 to descend at a lower airspeed, and also enable the aircraft 100 get airborne over a shorter distance. The slats 112, in the extended position, increase lift, and are typically used in conjunction with the flaps 108. The spoilers 114, on the other hand, reduce lift and when moved from retracted positions to extended positions, which is typically done during aircraft landing operations, may be used as air brakes to assist in slowing the aircraft 100.

Figure 2:
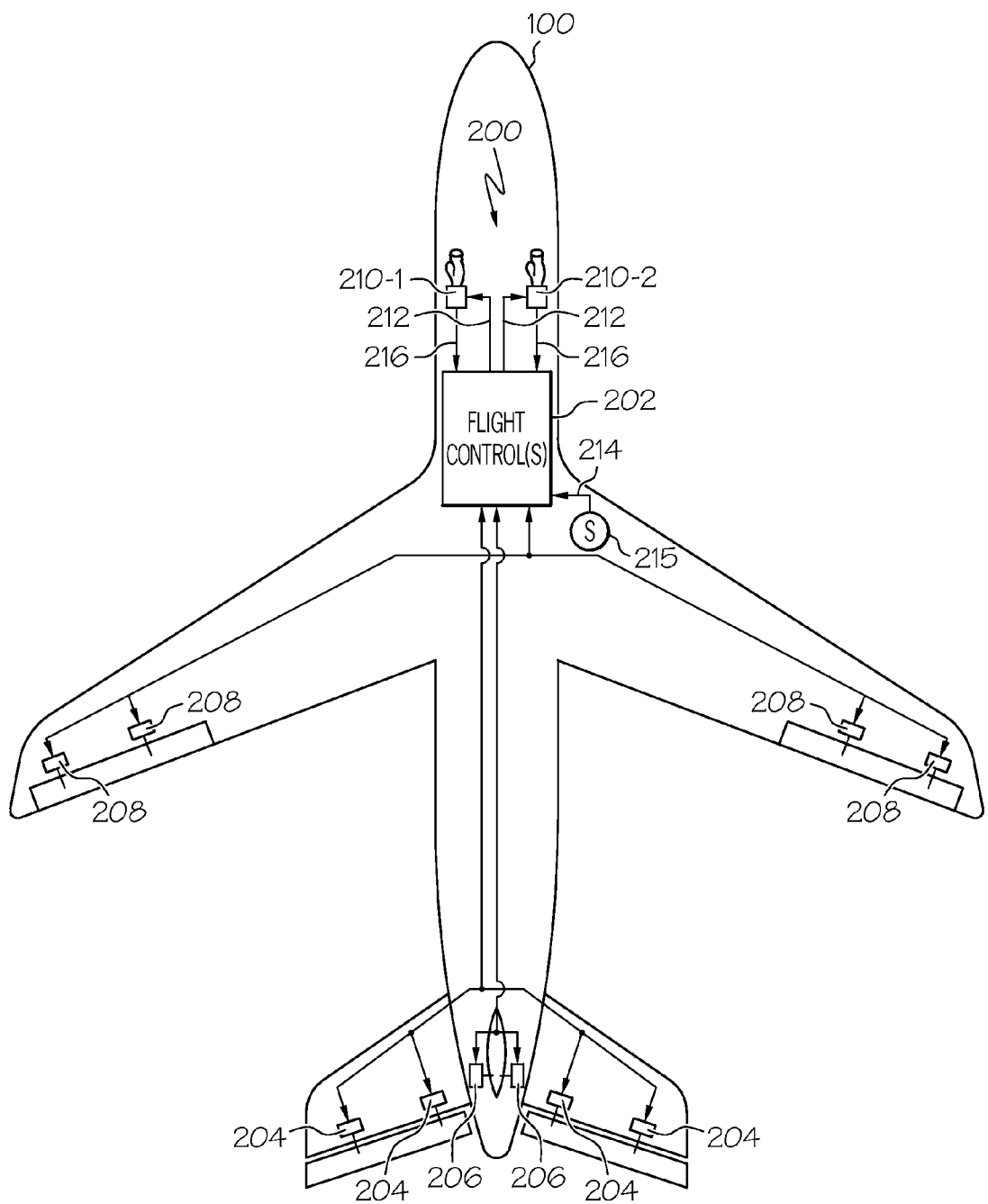
FIG. 2 is a schematic depicting portions of an exemplary flight control surface actuation system according one embodiment of the present invention.

The flight control surfaces 102-114 are moved to commanded positions via a flight control surface actuation system 200, an exemplary embodiment of which is shown in FIG. 2. In the depicted embodiment, the flight control surface actuation system 200 includes flight controls 202, a plurality of primary flight control surface actuators, which include elevator actuators 204, rudder actuators 206, and aileron actuators 208. It will be appreciated that the system 200 may be implemented with a plurality of flight controls 202. However, for ease of description and illustration, only a single, multi-channel flight control 202 is depicted. It will additionally be appreciated that one or more functions of the flight controls 202 could be implemented using a plurality of devices.

Before proceeding further, it is noted that the flight control surface actuation system 200 additionally includes a plurality of secondary control surface actuators, such as flap actuators, slat actuators, and spoiler actuators. However, the operation of the secondary flight control surfaces 108-114 and the associated actuators is not needed to fully describe and enable the present invention. Thus, for added clarity, ease of description, and ease of illustration, the secondary flight control surfaces and actuators are not depicted in FIG. 2, nor are these devices further described. Moreover, controls for the rudder 104 and non-illustrated aircraft brakes are also not included in FIGS. 2 and 3 for clarity and ease of description. Nonetheless, it will be appreciated that the invention may be applied at least to rudder controls in a similar fashion.

Returning now to the description, the flight control surface actuation system 200 may additionally be implemented using various numbers and types of primary flight control surface actuators 204-208. In addition, the number and type of primary flight control surface actuators 204-208 per primary flight control surface 102-106 may be varied. In the depicted embodiment, however, the system 200 is implemented such that two primary flight control surface actuators 204-208 are coupled to each primary flight control surface 102-106. Moreover, each of the primary flight control surface actuators 204-208 are typically a linear-type actuator, such as, for example, a ballscrew actuator or hydraulic cylinder. It will be appreciated that this number and type of primary flight control surface actuators 204-208 are merely exemplary of a particular embodiment, and that other numbers and types of actuators 204-208 could also be used.

No matter the specific number, configuration, and implementation of the primary flight control surface actuators 204-208, the flight controls 202 are configured to receive aircraft rate commands from one or more active inceptor systems. In the depicted embodiment, the system 200 includes two active inceptor systems—a pilot inceptor system 210-1 and a co-pilot inceptor system 210-2. It will be appreciated that in some embodiments the flight control surface actuation system 200 could be implemented with more or less than this number of inceptor systems 210. Moreover, and as was alluded to above, the inceptor system 210 (or systems) could be implemented as rudder/brake pedals or, if the aircraft is of the rotary-wing type, a cyclic and/or collective. Nonetheless, one or both of the inceptor systems 210, in response to user input supplied from a pilot and/or co-pilot, supply signals 212 representative of commanded aircraft rate to the flight control(s) 202.

The flight control(s) 202, in response to the signals supplied from the inceptor(s) 210, supplies power to the appropriate primary flight control surface actuators 204-208. The primary flight control surface actuators 204-208, upon being energized, move the appropriate primary flight control surfaces 102-106 to positions that will cause the aircraft 100 to implement the commanded maneuver at the commanded aircraft rate. As FIG. 2 additionally depicts, the flight control(s) 202 additionally receives one or more signals 214 representative of actual aircraft rate. As will be described in more detail below, the flight control(s) 202 determines a rate error based on the commanded aircraft rate and the actual aircraft rate and, based on the determined rate error, supplies a rate limit signal 216 to the inceptor system(s) 210.

Before proceeding further it is noted that the one or more signals 214 representative of actual aircraft rate may be supplied, for example, from one or more aircraft sensors 215 in operable communication with the flight control(s) 202. The aircraft sensors 215 may vary in number, type, and configuration. For example, the aircraft sensors 215 may include one or more attitude sensors, acceleration sensors, or airspeed sensors, just to name a few.

Figure 3:
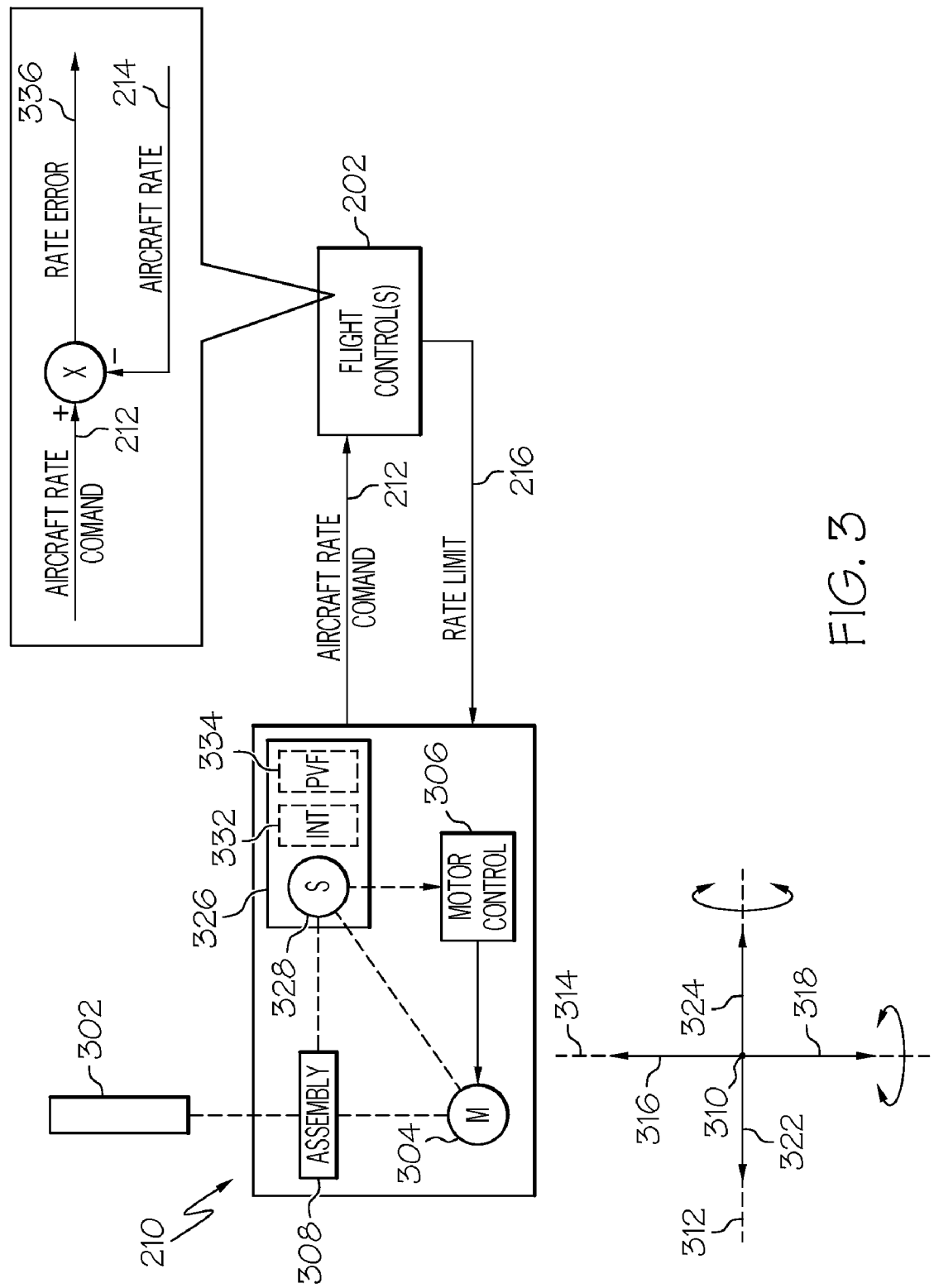
FIG. 3 is a functional block diagram of an exemplary embodiment of an inceptor systems that may be used to implement the system of FIG. 2.

Turning now to FIG. 3, a functional block diagram of an exemplary embodiment of one of the inceptor systems 210 coupled to the flight control(s) 200 is depicted. In the depicted embodiment, the inceptor system 210 includes an inceptor 302, a motor 304, and a motor control 306. The inceptor 302 may be implemented according to any one of numerous configurations. In the depicted embodiment, however, the inceptor 302 is implemented as a control stick that is preferably dimensioned to be grasped by a hand. The inceptor 302 is coupled to a suitable multiple degree-of-freedom assembly 308 that allows the inceptor 302, in response to input from a user, to be rotated to an inceptor position in a plurality of directions, and at a movement rate. A gimbal assembly is just one non-limiting example of a suitable multiple degree-of-freedom assembly 308.

Although the configuration of the inceptors 302 may vary, in the depicted fixed-wing embodiment, each inceptor 302 is configured to rotate, via the assembly 308, from a null position 310 to an control position, about two perpendicular rotational axes. In the depicted embodiment the rotational axes are a pitch axis 312 and a roll axis 314. More specifically, if a pilot or co-pilot moves the inceptor 302 in a forward direction 316 or an aft direction 318, to thereby control aircraft pitch, the inceptor 302 rotates at an inceptor movement rate about the pitch axis 312. Similarly, if the pilot or co-pilot moves the inceptor 302 in a port direction 322 or a starboard direction 324, to thereby control aircraft roll, the pilot inceptor 302 rotates at an inceptor movement rate about the roll axis 314. It will additionally be appreciated that the inceptor 302 may be moved at an inceptor movement rate in a combined forward-port direction, a combined forward-starboard direction, a combined aft-port direction, or a combined aft-starboard direction, and back to or through the null position 310, to thereby implement a combined aircraft pitch and roll maneuver.

No matter how the multiple degree-of-freedom assembly 308 is implemented, the inceptor system 210, as noted above, supplies signals 212 representative of commanded aircraft rate (e.g., aircraft rate commands) to the flight control(s) 202. The aircraft rate commands 212 may be commands representative of, for example, an aircraft pitch rate, an aircraft roll rate, a normal acceleration, a flight path angle rate, various combinations of these rates, or various blends of these rates, which may change with aircraft speed, just to name a few. The aircraft rate commands 212 supplied to the flight control(s) 202 may be derived using any one of numerous suitable devices and techniques. Generally, the aircraft rate commands 212 are related to the position of the inceptor 302. Thus, in the depicted embodiment, the inceptor system 210 additionally includes one or more inceptor sensors 326 (for clarity, only one shown). The inceptor sensor 326 senses the position of the inceptor 326, either directly or indirectly, and supplies inceptor position signals based on the sensed inceptor position. It will be appreciated that the inceptor position signals may be supplied directly to the flight control(s) 202 as the aircraft rate commands 212. Alternatively, the inceptor position signals may be supplied to other devices, such as the motor control 306 or one or more other non-illustrated devices, which in turn generate the aircraft rate commands 212 based on the inceptor position signals.

The inceptor sensor 326 may be implemented using various types of suitable position and/or force sensors. For example, in one embodiment the inceptor sensor 326 may be implemented as a position sensor 328 that is coupled to the inceptor 302, either directly or via one or more non-illustrated gear sets, and supplies the inceptor position signals. In another embodiment, the inceptor sensor 326 may be implemented as a motor position sensor that is coupled to the motor 304, either directly or via one or more non-illustrated gear sets. In this embodiment, the inceptor sensor 326 includes not only a suitable rotational position sensor 328, but may additionally include an integrator 332. The rotational position sensor 328 senses the rotational position of the motor 304 and supplies motor rotational position signals to the integrator 332. The integrator 332, in response to the motor rotational position signals, supplies the inceptor position signals. It will be appreciated that the motor rotational position sensor 328 may be the same sensor that is used by the motor control 306 to commutate the motor 304. It will additionally be appreciated that or more additional position sensors (not depicted) may be included if inceptor position is derived from motor position to, for example, initialize the integrator 332. In yet another embodiment, the inceptor sensor 326 may be implemented as a force sensor. In this embodiment, the inceptor sensor 326 includes a suitable force sensor 328 and an inceptor position determination circuit 334. The force sensor 328 is coupled to, and senses an input force supplied to, the inceptor 302, and supplies force signals representative of the sensed input force. The inceptor position determination circuit 334 is coupled to receive the force signals from the force sensor 328 and, in response, determines the position of the inceptor 302 and supplies the inceptor position signals.

The motor 304 is coupled to the inceptor 302 and is operable, upon being energized, to supply a feedback force to the inceptor 302. In the depicted embodiment, the motor 304 is coupled to the inceptor 302 via the multiple degree-of-freedom assembly 308, and may additionally be coupled to the inceptor 302 via one or more non-illustrated gear sets. In any case, the feedback force supplied by the motor 304 to the inceptor 302 is typically in opposition to the input force supplied to the inceptor 302 from a user (e.g., pilot or co-pilot), to thereby supply haptic feedback to the user. In this regard, although the inceptor system 210 is depicted in FIG. 3 with only a single motor 304 for clarity and ease of depiction and description, it will be appreciated that the inceptor system 210 may be implemented with more than one motor 304. For example, the inceptor system 210 may be implemented with a plurality of independent motors 304, with at least one motor 304 associated with each of the perpendicular rotational axes 312, 314. No matter the number of motors 304 that are included, the motor 304 is preferably implemented as a permanent magnet brushless machine. Moreover, the motor 304 is controllably energized via the motor control 306.

The motor control 306 is coupled to receive various signals and, in response to these signals, controllably energizes the motor 304, from a non-illustrated power source, to supply feedback force to the inceptor 302. In the depicted embodiment, the motor control 306 controllably energizes the motor 304 based on at least the above-mentioned rate error 336. To do so, the motor control 306 is coupled to receive, and is responsive to, the rate limit signal 216 supplied from the flight control(s) 202. The rate limit signal 216, as was previously noted, is based on the rate error 336, and the rate error 336, at least in the depicted embodiment, is determined in the flight control(s) 202 by comparing the commanded aircraft rate 212 and the actual aircraft rate 214.

In one embodiment, the rate limit signal 216 that is supplied from the flight control(s) 202 is at least representative of the determined rate error 336. In this embodiment, the motor control 306, in response to the rate limit signal 216, determines a dynamic inceptor rate limit and energizes the motor 304 to supply feedback force to the inceptor 302 at a magnitude that limits the movement rate of the inceptor 302 to the dynamic inceptor rate limit. In another embodiment, the flight control(s) 202 is configured to determine the dynamic inceptor rate limit from the rate error 336. In this embodiment, the rate limit signal 216 supplied from the flight control(s) 202 to the motor control 306 is representative of the dynamic inceptor rate limit. Thus, the motor control 306 in this latter embodiment need not be configured to determine the dynamic rate. The motor control 306 is, however, still configured to energize the motor 304 to supply feedback force to the inceptor 302 at a magnitude that limits the movement rate of the inceptor 302 to the dynamic inceptor rate limit.

No matter the source of the dynamic inceptor rate limit, it will nonetheless be appreciated that this limit is variable in value. More specifically, the dynamic inceptor rate limit is a value that is modulated based on the rate error 336, and is inversely proportion to the rate error 336. Thus, if there is a relative increase in the rate error 336, then there will concomitantly be a relative decrease in the dynamic inceptor rate limit. As a result, the motor control 306 will effect a relative increase in the feedback force supplied to the inceptor 302 to limit inceptor movement rate. Conversely, if there is a relative decrease in the rate error 336, then there will concomitantly be a relative increase in the dynamic inceptor rate limit. As a result, the motor control 306 will effect a relative decrease in the feedback force supplied to the inceptor 302 to allow a relative increase in inceptor movement rate. It may thus be appreciated that rate limiting inceptor position in this manner provides immediate haptic feedback to the user (e.g., pilot or co-pilot) when there is a mismatch between the actual aircraft rate and the commanded aircraft rate.

Figure 4:
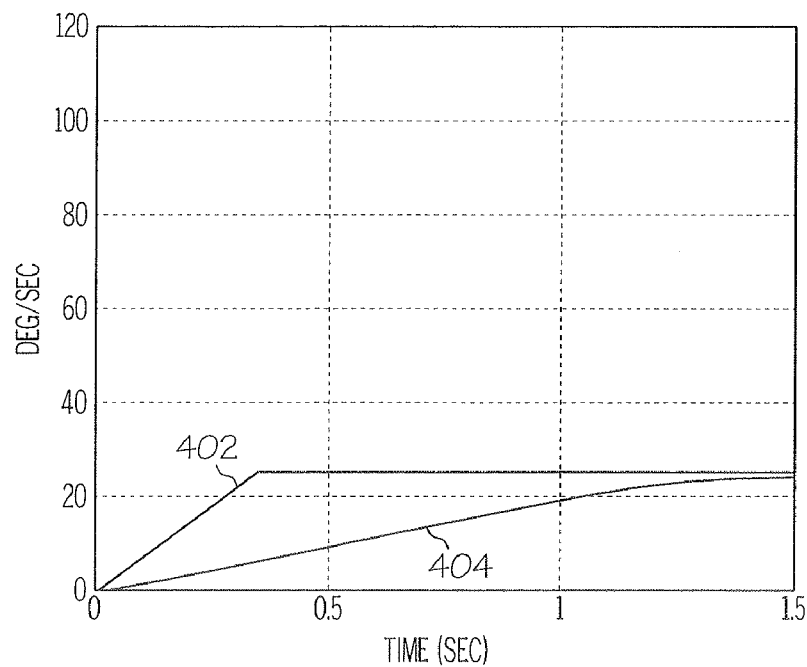
FIG. 4 graphically depicts a time history of a relatively rapid control input to a conventionally configured fly-by-wire flight control system.
Figure 5:
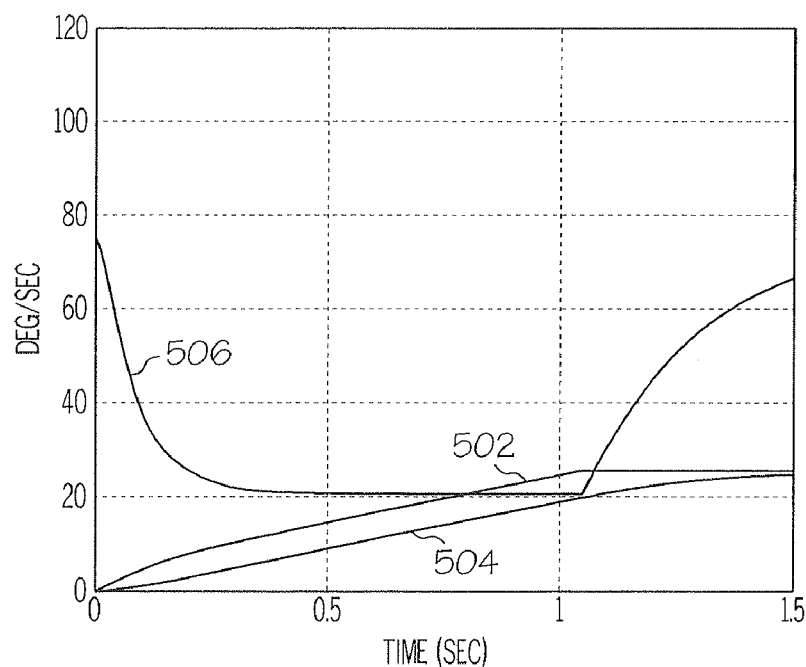
FIG. 5 graphically depicts a time history of a relatively rapid control input to a fly-by-wire flight control system configured according to an exemplary embodiment of the present invention.

To illustrate the effectiveness of limiting inceptor movement rate, reference should now be made to FIGS. 4 and 5. In particular, FIG. 4 graphically depicts a time history of a relatively rapid control input to a conventionally configured fly-by-wire flight control system. The control input supplied to the inceptor is an aircraft roll command. Thus, FIG. 4 simultaneously depicts the resulting inceptor position 402 and actual aircraft roll rate 404 response to the control input. In the conventionally configured system, inceptor position 402 quickly reaches its full deflection; however, actual aircraft roll rate 404 lags behind, needing more than a full second to achieve the commanded roll rate. In the meantime, a relatively large control input error exists.

Conversely, FIG. 5 graphically depicts a time history of the same relatively rapid control input to a fly-by-wire flight control system configured in accordance with one of the embodiments described herein. Thus, FIG. 5 simultaneously depicts not only the resulting inceptor position 502 and actual aircraft roll rate 504 to the control input, but additionally depicts the dynamic inceptor rate limit 506. It is seen that with this system the dynamic inceptor rate limit 506 decreases as inceptor position 502 deviates from the actual aircraft roll rate 504. As a result, the inceptor movement rate quickly reaches a value that matches the actual aircraft roll rate 506, thereby significantly reducing the control input error.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An active pilot inceptor system, comprising:
a pilot inceptor configured to receive user input and, in response to the user input, to (i) move to an inceptor position at an inceptor movement rate and (ii) supply signals representative of a commanded aircraft rate;
a motor coupled to the pilot inceptor and configured, upon being energized, to supply a feedback force to the inceptor that limits at least the inceptor movement rate; and
a motor control configured to receive a rate limit signal that is based on a determined rate error, the rate error being a representative of a difference between the commanded aircraft rate and an actual aircraft rate, the motor control further configured to respond to the rate limit signal to energize the motor to supply the feedback force at a magnitude that limits the inceptor movement rate based on the determined rate error.

2. The inceptor system of claim 1, wherein:
the rate limit signal is representative of the determined rate error; and
the motor control is responsive to the rate limit signal to (i) determine a dynamic inceptor movement rate limit and (ii) energize the motor to supply the feedback force at a magnitude that limits the inceptor movement rate to the dynamic inceptor movement rate limit.

3. The inceptor system of claim 1, wherein:
the rate limit signal is representative of a dynamic inceptor movement rate limit; and
the motor control is responsive to the rate limit signal to energize the motor to supply the feedback force at a magnitude that limits the inceptor movement rate to the dynamic inceptor movement rate limit.

4. The system of claim 1, wherein the inceptor comprises:
an inceptor sensor operable to (i) sense the inceptor position and (ii) supply the signal representative of commanded aircraft rate based on the sensed inceptor position.

5. The system of claim 4, wherein inceptor sensor comprises:
an inceptor position sensor coupled to the inceptor, the inceptor position sensor operable to sense the inceptor position and supply the signal representative of commanded aircraft rate.

6. The system of claim 4, wherein the inceptor sensor comprises:
a motor position sensor coupled to the motor, the motor position sensor operable to sense motor rotational position and supply a motor rotational position signal representative thereof; and
an integrator coupled to receive the motor rotational position and operable, in response thereto, to supply the signal representative of commanded aircraft rate.

7. The system of claim 4, wherein the inceptor sensor comprises:
a force sensor coupled to the inceptor, the force sensor operable to sense an input force supplied to the inceptor and supply a force signal representative thereof; and
an inceptor position determination circuit coupled to receive force signal and operable, in response thereto, to (i) determine the inceptor position and (ii) supply the signal representative of commanded aircraft rate based on the determined inceptor position.

8. A flight control system, comprising:
a flight control configured to receive a signal representative of commanded aircraft rate and a signal representative of actual aircraft rate and, in response these received signals, to determine a rate error and supply a rate limit signal based on the determined rate error;

an inceptor configured to receive user input and, in response to the user input, to (i) move to an inceptor position at an inceptor movement rate and (ii) supply the signal representative of commanded aircraft rate;

a motor coupled to the inceptor and configured, upon being energized, to supply a feedback force to the inceptor that limits at least the inceptor movement rate; and a motor control coupled to receive the rate limit signal and configured, in response thereto, to energize the motor to supply the feedback force at a magnitude that limits the inceptor movement rate based on the determined rate error.

9. The system of claim 8, wherein:

the rate limit signal is representative of the determined rate error; and the motor control is responsive to the rate limit signal to (i) determine a dynamic inceptor movement rate limit and (ii) energize the motor to supply the feedback force at a magnitude that limits the inceptor movement rate to the dynamic inceptor movement rate limit.

10. The system of claim 8, wherein:

the flight control is further operable to determine a dynamic inceptor movement rate limit;

the rate limit signal is representative of the determined dynamic inceptor movement rate limit; and the motor control is responsive to the rate limit signal to energize the motor to supply the feedback force at a magnitude that limits the inceptor movement rate to the dynamic inceptor movement rate limit.

11. The system of claim 8, wherein the inceptor comprises:

an inceptor sensor operable to (i) sense the inceptor position and (ii) supply the signal representative of commanded aircraft rate based on the sensed inceptor position.

12. The system of claim 11, wherein inceptor sensor comprises:

an inceptor position sensor coupled to the inceptor, the inceptor position sensor operable to sense the inceptor position and supply the signal representative of commanded aircraft rate.

13. The system of claim 11, wherein the inceptor sensor comprises:

a motor position sensor coupled to the motor, the motor position sensor operable to sense motor rotational position and supply a motor rotational position signal representative thereof; and an integrator coupled to receive the motor rotational position and operable, in response thereto, to supply the signal representative of commanded aircraft rate.

14. The system of claim 11, wherein the inceptor sensor comprises:

a force sensor coupled to the inceptor, the force sensor operable to sense an input force supplied to the inceptor and supply a force signal representative thereof; and an inceptor position determination circuit coupled to receive force signal and operable, in response thereto, to (i) determine the inceptor position and (ii) supply the signal representative of commanded aircraft rate based on the determined inceptor position.

15. The system of claim 8, wherein the flight control is further operable, in response to the a signal representative of commanded aircraft rate, to supply actuator control signals, and wherein the system further comprises:

a plurality of flight control surface actuators, each flight control surface actuator coupled to receive at least selected ones of the actuator control signals.

16. The system of claim 8, further comprising:

an aircraft sensor in operable communication with the flight controls to supply the signal representative of actual aircraft rate.

\* \* \* \* \*